United States Patent [19]

Skelly et al.

[11] 3,972,589

[45] Aug. 3, 1976

[54] NEMATIC LIQUID CRYSTAL MIXTURES WITH STABLE HOMEOTROPIC BOUNDARY CONDITIONS AND METHODS OF MAKING THE SAME

[75] Inventors: David W. Skelly, Burnt Hills; Gordon J. Sewell, Albany, both of N.Y.

[73] Assignee: General Electric Company, Schenectady, N.Y.

[22] Filed: Jan. 7, 1974

[21] Appl. No.: 431,117

Related U.S. Application Data

[63] Continuation-in-part of Ser. No. 265,794, June 23, 1972, abandoned.

[52] U.S. Cl. ............... 350/160 LC; 252/299; 252/408; 350/150
[51] Int. Cl.² ............... C09K 3/34; G02F 1/13
[58] Field of Search ............... 252/408 LC, 299; 350/160 LC, 150

[56] References Cited
UNITED STATES PATENTS

| | | | |
|---|---|---|---|
| 3,694,053 | 9/1972 | Kahn | 252/299 |
| 3,697,150 | 10/1972 | Wysocki | 252/408 |
| 3,803,050 | 4/1974 | Haas et al. | 252/408 |
| 3,809,456 | 5/1974 | Goldmacher et al. | 252/408 |
| 3,838,059 | 9/1974 | Wong | 252/299 |
| 3,848,966 | 11/1974 | Smith et al. | 252/299 |

OTHER PUBLICATIONS

"Surface Active Agents and Detergents", vol. II., Schwartz, A., Perry, J. & Berch, J., Interscience Pubs, Inc., N.Y. pp. 103–104 (1958).

*Primary Examiner*—Benjamin R. Padgett
*Assistant Examiner*—T. S. Gron
*Attorney, Agent, or Firm*—Geoffrey H. Krauss; Joseph T. Cohen; Jerome C. Squillaro

[57] ABSTRACT

Nematic liquid crystal mixtures characterized by a homeotropic boundary condition are prepared by the addition of soluble monopolar compounds to either positive or negative dielectric anisotropic nematic materials. Between approximately 0.5 and 5 percent by weight of compounds such as certain carboxylic acids, aliphatic amines and aliphatic nitriles, for example, when dissolved in a nematic material produce spontaneous homeotropic boundary conditions therein.

10 Claims, 3 Drawing Figures

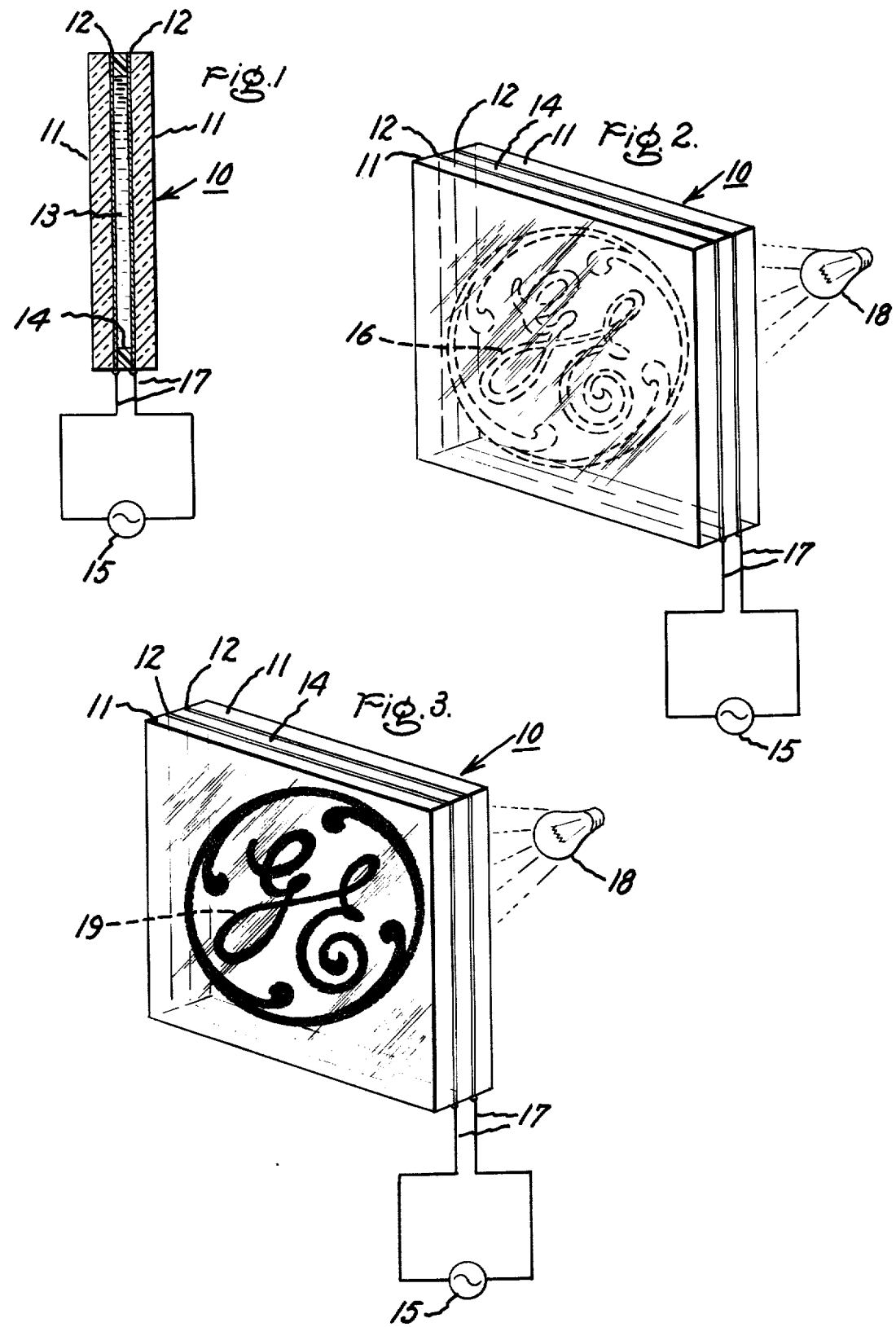

NEMATIC LIQUID CRYSTAL MIXTURES WITH STABLE HOMEOTROPIC BOUNDARY CONDITIONS AND METHODS OF MAKING THE SAME

This application is a continuation-in-part of application Ser. No. 265,794, filed June 23, 1972, now abandoned and relates to copending application Ser. No. 379,723, filed July 16, 1973, which is a continuation of Ser. No. 265,792, filed June 23, 1972, now abandoned, having a common assignee with the present application.

The present invention relates to liquid crystal compositions and more particularly to nematic liquid crystal compositions having stable homeotropic boundary conditions.

Nematic liquid crystal compositions are a class of materials which exhibit properties of both solid and liquid state over a substantial temperature range just above the melting point of the solid materials. Above the upper limit of this temperature range, nematic liquid crystal compositions exhibit properties of an isotropic liquid and below the temperature range the materials exhibit properties of solid crystals. Within this range of temperatures, the materials are said to be in a mesophase condition. In this mesophase condition, nematic liquid crystal compositions appear hazy or milky when formed in a thin layer, such as when mounted between two glass substrates. The hazy or milky appearance of thin layers of nematic liquid crystal compositions results from characteristic patterns which are known as textures. The various textures result from the relative alignment of the liquid crystal molecules with respect to the substrates. A small sample of material, for example, inspected under a microscope may reveal the presence of more than one texture.

Molecules of nematogenic substances in general have a cylindrical shape. In the mesophase, the molecules align themselves in a common direction with their long axes parallel to each other. A region with the same nematic orientation or director may comprise tens of thousands of molecules. For example, a macroscopic sample, i.e., a drop of liquid crystal, contains many regions with different nematic directors. All molecules in a microscopic sample may be oriented in the same direction, i.e., a single "crystal" can be produced, by application of magnetic or electric fields. In the field-free condition, however, even microscopic samples exhibit numerous regions with different nematic directors. Hence, when placed between glass substrates, for example, the liquid crystal appears to be slightly hazy or cloudy. This cloudiness arises from the random molecular alignment of the nematic directors. If the nematic directors could be aligned perpendicular to the surface of the substrates, for example, the nematic liquid would appear optically clear.

Copending patent application Ser. No. 379,723 by H. S. Cole describes methods for aligning nematic directors with their long axes parallel to a substrate by the addition of soluble compounds having at least two polar groups to a nematic liquid crystal composition. The additives improve the optical clarity of nematic liquid crystal displays and increase the contrast ratio of such displays. Reference may be made to the foregoing application for a more detailed description of that invention.

Another boundary condition of nematic liquid crystal compositions in which the nematic directors align substantially perpendicular to the substrates is called homeotropic. When viewed in convergent light in a polarizing microscope, samples exhibit the conoscopic figure of a cross characteristic of positive uniaxial crystals.

One prior art method for producing homeotropic boundary conditions in N-(p-methoxybenzylidene)-p-(n-butyl)-aniline (MBBA) includes the addition of small amounts of polyamide resin. This work is reported by Haas et al in Physical Review Letters, Vol. 25, No. 19, dated Nov. 9, 1970. A similar effect is reported by Cladis et al. by the addition of n-dodecanol. The observations of Cladis et al. are repoted in Mol. Cryst. and Liq. Cryst. 13(1), 1(1970). Although these two mixtures have been useful for some applications, they have not been widely accepted or employed for several reasons. For example, the polyamide resin is of a polymeric nature and difficult to purify. The presence and control of the purity of additives is important where effects are sensitive to conductivity changes and surface contamination. The dodecanol boundary condition has not been found to be uniform and stable, especially in display cells of large surface areas.

Another method of forming nematic liquid crystal materials with homeotropic boundary conditions is described in U.S. Pat. No. 3,656,834 by Haller et al. This patent describes a nematic material having dissolved therein a material having the formula $RR'_3N^+X^-$ where R is selected from the group consisting of alkyl radicals having 10 to 24 carbon atoms, R' is selected from the group consisting of methyl and ethyl and $X^-$ is selected from the group consisting of anions derived from simple acids. This additive is described as providing the homeotropic alignment of the liquid crystal molecules. Although this additive may produce homeotropic boundary conditions in a liquid crystal material, certain characteristics of the mixture render it unsuitable for some applications. For example, the aforementioned additive of Haller et al is basically a salt which is ionic and hence tends to increase the conductivity of the liquid crystal mixture undesirably, requiring increased power to operate display devices utilizing such mixtures. Further, when such display devices are operated with direct currents or even alternating currents with a direct current offset, the salts decompose instantly, and hence render the display device unsatisfactory.

It is therefore an object of this invention to provide nematic liquid crystal compositions with non-ionic additives which produce stable homeotropic boundary conditions.

It is yet another object of this invention to provide nematic liquid crystal compositions including monopolar additives which produce stable homeotropic boundary conditions in the liquid crystal composition.

It is yet another object of this invention to provide nematic liquid crystal display devices which are substantially transparent in the absence of an electric field and substantially opaque in the presence of an electric field.

It is still another object of this invention to provide nematic liquid crystal devices with stable homeotropic boundary conditions.

The foregoing objects and others are accomplished in accord with our invention by the dissolution of monopolar compounds into nematic liquid crystal compositions. The term monopolar compounds is intended to include those materials which produce a homeotropic boundary condition in a nematic liquid crystal composition by the adhesion of at least one polar moiety to the glass substrates, for example, which contain the liquid crystal composition. Suitable monopolar compounds which produce the desired homeotropic boundary condition in the nematic liquid crystals are carboxylic acids, aliphatic amines and aliphatic nitriles. Monopolar compounds when dissolved in nematic liquid crystals in suitable concentrations, such as between approximately 0.5 and 5 percent by weight, for example, permit the fabrication of large area (e.g., 50 square inches or more) display devices which are substantially transparent in the field-free condition and are substantially opaque in the D.C. or low frequency field condition.

A better understanding of my invention as well as other objects and further advantages thereof will become more apparent to those skilled in the art from the following detailed description, taken in connection with the accompanying drawings in which:

FIG. 1 is a cross-sectional view of a liquid crystal display cell;

FIG. 2 is an isometric view of an embodiment of a liquid crystal display cell wherein the desired image to be formed is illustrated in outline form; and FIG. 3 is an isometric view of an embodiment of my invention wherein the desired image is defined by the shaded area.

FIG. 1 illustrates a liquid crystal display cell 10 comprising a pair of spaced planar substrates 11 such as glass plates, with transparent electrodes 12 along the inner faces of the substrates 11. A nematic liquid crystal composition 13 such as N-(p-methoxybenzylidene)-p-(n-butyl) aniline (MBBA), for example, (where the net dielectric anisotropy, $\Delta\epsilon$, is less than zero and $\Delta\epsilon = \epsilon_{\parallel} - \epsilon_{\perp}$, a characteristic of dynamic scattering materials) is contained within the substrates 11 by a spacer and sealing gasket 14. In general, the spacing between the substrates may vary between approximately 5 and 150 microns.

The conductive coatings 12 are electrically connected to an external voltage source 15 such as an alternating current or direct current source of voltage by conductors 17. The voltage source 15 is used to provide an electric field across the nematic liquid crystal 13.

FIG. 2 illustrates an isometric view of an embodiment of our invention wherein the desired image to be formed in the liquid crystal display cell 10 is illustrated in outline form and referred to by the numeral 16. Since this desired image is formed in the substantially transparent conductive coating 12, it is not readily visible in the presence of a light source 18. In the absence of an electric field, the liquid crystal display cell appears substantially transparent where it is to be employed in the light transmissive mode and would appear to provide a mirrored surface if the display cell is to be operated in a light reflective mode.

FIG. 3 illustrates the display cell 10 with a suitable electric field applied across the nematic liquid crystal such that turbulence is produced in the liquid crystal in the region 19 of the applied electric field and hence light scattering occurs.

Operationally, in the absence of an electric field, i.e., an unexcited condition, the display advantageously should appear substantially transparent, whereas in the excited (applied field) condition the liquid crystal is rendered substantially opaque or at least translucent in the regions of the applied field and hence scatters light incident thereon. An image thus formed in the regions of the transparent conductive coatings 12 appears as an opaque or frosted area 19 in the display cell.

Our invention may also be practiced with positive anisotropic materials, such as p-ethoxybenzilideneaminobenzonitrile. This class of materials tends to align in a direction of an applied electric field, either A.C. or D.C. Characteristics of these so-called "field effect" displays employing positive anisotropic materials are more fully described by M. Schadt and W. Helfrich, Applied Physics Letters 18, 127(1971).

An example of the use of positive anisotropic materials includes two polarizers, one positioned in front of a liquid crystal display cell and the other positioned behind the display cell. The polarizers are crossed (i.e., oriented at 90° to each other) and the display cell includes at least two adjacently spaced conductive regions on the same surface of a glass substrate. In the presence of an electric potential on these conductive regions, the positive anisotropic liquid crystal material molecules are aligned parallel to the substrates in the region intermediate the conductive regions and light incident on the polarizers is rotated by the liquid crystal molecules and allowed to pass through the second polarizer. However, in the absence of an electric field, the liquid crystal molecules are aligned perpendicular to the glass substrates and light entering the display cell is no longer rotated and hence does not pass through the second polarizer. In this way, light transmission is readily controlled by the orientation of the liquid crystal molecules.

As pointed out above, one of the particularly troublesome problems encountered in the fabrication of liquid crystal display devices has been the inability to obtain nematic materials which in the unactivated condition are substantially transparent (for negative anisotropy materials) and in addition, of uniform molecular alignment for positive anisotropy materials. Most nematic liquid crystal materials are hazy or cloudy in appearance even when used in thin layers between glass substrates, for example. The cloudiness or haziness reduces the ratio of the light scattered in the activated condition to the light scattered in the unactivated condition and hence produces contrast ratios which are not entirely acceptable for display applications.

In accord with our invention, we have found that homeotropic boundary conditions are spontaneously produced in nematic liquid crystals by dissolving effective amounts of monopolar additives therein. The term monopolar additive as used herein includes those materials which produce a homeotropic boundary condition in a nematic liquid crystal material by the adhesion of at least one polar moiety to the glass substrates, for example, containing the liquid crystal material. The term polar moiety means that portion of the molecule which is relatively more negative or positive than the hydrocarbon portion. Those skilled in the art can readily appreciate the numerous advantages flowing from this discovery. For example, the cloudiness or haziness customarily characteristic of liquid crystal display devices employing negative anisotropy materials, for example, is substantially reduced and hence the ratio of light scattered in the unactivated condition is substantially improved. Also, for positive anisotropy materials, as described above, the addition of our monopolar additives produces a more uniformly appearing display where a "twisted nematic" display is desired. Still other advantages will become more apparent from the following description.

Examples of monopolar molecular additives which produce a homeotropic boundary condition in nematic liquid crystals include unsaturated carboxylic acids having a chemical formula of $$CH_3-(CH_2)_{n-x}(CH)_x-COOH$$

where $n$ is an even integer between 5 and 26; saturated (i.e., $x = 0$) carboxylic acids where $n$ is an integer between 5 and 15; primary amines, having a chemical formula of $$RNH_2$$

where $R = CH_3(CH_2)_n$ and $n$ is an integer from 5 to 26. Examples of primary amines include n-hexylamine and laurylamine; secondary amines having a chemical formula of

where $R = CH_3(CH_2)_n$ where $n$ is an integer from 5 to 26 and $R' = CH_3(CH_2)_m$ where $m$ is an integer from 0 to 2; and nitriles having a formula of $$CH_3-(CH_2)_n-CN$$

where $n$ varies from 5 through 26.

Those skilled in the art will also appreciate that still other monopolar molecular additives such as aliphatic nitro compounds and sulfonic acids may also be employed, if desired.

The foregoing additives are dissolved in the liquid crystal in amounts effective to produce the desired homeotropic boundary condition; generally, between approximately 0.5 and 5 percent by weight is sufficient. Where desired, the dissolution may be achieved by raising the temperature of the mixture above the nematic-isotropic transition temperature. Generally, however, even where heating is required, dissolution occurs within 1 to 30 minutes.

With regard to the concentration of monopolar additives, concentrations of less than 0.5 percent by weight may be employed if desired, but the minimum useful concentration is ultimately limited by failure to produce the desired homeotropic boundary conditions. Concentrations of of the monopolar additives higher than 5 percent may also be employed, however, higher concentrations increase the conductivity of the liquid crystal undesirably or may not be totally dissolved in the liquid crystal or may depress the nematic-isotropic transition temperature to an undesirably low temperature. Hence, the preferred range of between approximately 0.5 and 5 percent by weight of the monopolar additive is most useful in practicing our invention. In general, within this range of concentrations, it is desirable to use only that amount which is required to produce the desired results. Typically, 1 to 2 percent of the monopolar additive is sufficient to produce the desired homeotropic boundary condition.

As pointed out above, my invention is not limited to any particular nematic liquid crystal material. Various nematic liquid crystals may be employed, such as those described in U.S. Pat. Nos. 3,322,485 — Williams and 3,499,702 — Goldmacher et al. Both of these patents are exemplary of other useful nematic liquid crystal materials.

A qualitative analysis of the improvement obtained by the addition of monopolar additives to nematic liquid crystal materials has shown an improvement in transmissivity of from about 67 percent for nematic liquid crystal displays without the additive to approximately 74 percent for those displays including the monopolar additives. These transmission characteristics were obtained by measuring a 6° cone of light transmitted through a display cell, such as illustrated in FIG. 1. A photodetector was employed to record the transmitted light intensity. Calibration of the photodetector at the zero and 100 percent levels was performed in the absence of the display cell.

Without limiting our invention to any particular theory of operation, we believe the ability to obtain spontaneous homeotropic alignment of nematic liquid crystal molecules is a result of polar alignment of the molecules dissolved in the liquid crystal. More specifically, the substrates employed in the fabrication of liquid crystal devices generally include glass, glass coated with tin oxide, indium oxide, aluminum or chromium, for example. These substrates are more polar than the nematic liquid crystal material. Hence, where monopolar molecules are dissolved in the liquid crystal composition, it is believed the polar moiety becomes attracted to the polar substrate. The carbon chain, for example, then aligns perpendicular to the substrate and hence promotes cooperative alignment of the liquid crystal molecules in the same manner. It is believed that, depending upon the solubility of the monopolar additive, only the amount necessary for an effective coating of the walls of the cell need be added. The remainder, in solution in the bulk of the cell, does not add to producing the homeotropic boundary. Since the polar moiety has a preference for adhesion to a surface, the necessary amount, within the range specified above, can be determined empirically.

The foregoing theory by which homeotropic molecular alignment is achieved is compatible with observations made of various monopolar additives to nematic liquid crystals. For example, the addition of lauric acid in a concentration of one percent by weight to a nematic liquid crystal such as MBBA produces a homeotropic boundary condition therein. Lauric acid is a saturated fatty acid having the formula $$CH_3(CH_2)_{10}COOH.$$

The polar end group (COOH) attaches itself to the substrate and by cooperative alignment produces the homeotropic boundary condition in the nematic liquid crystal. The number of $CH_2$ groups may vary, such that other acids result, but nonetheless the polar end group attaches itself to the substrate and by cooperative alignment produces the homeoptropic boundary condition. Accordingly, in practicing our invention, homeotropic boundary conditions are produced in nematic liquid crystals by the addition of monopolar molecular additives which are characterized by their substantial solubility in the nematic liquid crystal material.

In order that those skilled in the art may better understand my invention, the following examples are given by way of illustration and not by way of limitation. In all of the examples, parts are by weight and temperatures are in degrees Celsius unless other wise stated.

EXAMPLE 1

One hundred grams of MBBA is mixed with 1 gram of stearic acid. Glass substrates having appropriate patterns etched in stannic oxide are cleaned and air dried. The glass substrates are sealed along the perimeter thereof with a spacing of approximately 12 microns therebetween. The resulting cell is filled with the liquid crystal mixture through a small aperture in the glass (with a second aperture providing escape for the gases) and the apertures are then sealed. The resultant cell with the nematic liquid crystal mixture contained therein exhibits a homeotropic boundary condition. An electric field of approximately $10^4$ volts per centimeter applied across the liquid crystal mixture produces a turbulent condition in the display cell and light incident thereon is scattered.

The results obtained in the above example are not reproducible. This is believed due to the production of a super-saturated solution of stearic acid, which is only slightly soluble in liquid crystal material and unstable in a super-saturated solution. Thus, while it may be possible to use stearic acid, the resulting cell is not practical.

It is believed that two effects determine the suitability of compounds for the present invention. One is the minimum chain length that will induce a homeotropic boundary condition. For carboxylic acids, this is believed to be 5 carbon atoms in the chain, i.e., $n$ in the above formula equals 5. For chains shorter than this, the monopolar compound is not long enough to cause cooperative alignment of the liquid crystal molecules. Examples of unsuitable compounds include butyric acid and acetic acid.

The second effect relates to the solubility of the monopolar additive, which decreases rapidly with increasing $n$ particularly in the case of saturated carboxylic acids. One adjustment that can be made is to use unsaturated acids for $n$ greater than approximately 14. Thus, instead of palmitic acid [$CH_3—(CH_2)_{14}—COOH$] one could use palmitoleic acid [$CH_3—(CH_2)_{12}(CH)_2—COOH$]. Similarly, instead of stearic acid [$CH_3—(CH_2)_{16}—COOH$], one could use oleic acid [$CH_3—(CH_2)_{14}(CH)_2—COOH$]. One difficulty with unsaturated acids is that more careful cell fabrication is required to assure that these acids do not become oxidized. This is a known characteristic of these acids and can be allowed for in fabricating the liquid crystal cells.

EXAMPLE 2

Three grams of oleic acid is dissolved in 100 grams of a nematic liquid crystal compound of MBBA. The mixture is introduced into a liquid crystal display cell in which the glass substrates are sealed along the perimeter and spaced from each other by approximately 10 microns. The resultant dispaly device exhibits a homeotropic boundary condition in the unactivated condition and exhibits dynamic scattering or random molecular alignment under the influence of an electric field of approximately $10^4$ volts per centimeter.

EXAMPLE 3

Two grams of heptanenitrile is added to 100 grams of MBBA. The mixture is heated to 60°C. for 5 minutes and then cooled to room temperature. Glass substrates, coated with tin oxide and having patterns etched therein are sealed and filled with the liquid crystal mixture as described in Example 1 to produce a liquid crystal display cell exhibiting a homeotropic boundary condition. The display appears substantially transparent in the unactivated condition.

EXAMPLE 4

Two grams of octadecylamine and 50 grams of MBBA are heated to 60°C. for 5 minutes. The mixture is introduced into a display cell as described in Example 1. The display appears substantially transparent in the unactivated condition due to the homeotropic alignment of the liquid crystal molecules and with the application of a low frequency field, turbulence is produced in the liquid crystal and light scattering is visible.

Although the above examples have shown various modifications and variations of my invention, it is obvious that still other modifications and variations are possible and will be readily recognized by those skilled in the art. For example, other nematic liquid crystal compositions may be employed and still other configurations for display devices are possible. Also, both reflective and transmissive modes of operation may be employed, if desired. It is therefore to be understood that changes may be made in the particular embodiment of the invention described which fall within the full intended scope of the invention as defined by the appended claims.

What we claim as new and desire to secure by Letters Patent of the United States is:

1. A nematic liquid crystal mixture characterized by a homeotropic boundary condition when formed in a thin layer, said mixture comprising a nematic liquid crystal and a monopolar additive selected from the group consisting of aliphatic mono-carboxylic acids and aliphatic nitriles, said additive being characterized by a concentration of between approximately 0.5% and approximately 5% by weight thereof completely dissolving in the nematic liquid crystal.

2. The mixture of claim 1 wherein said nematic liquid crystal has either a positive or a negative dielectric anisotropy.

3. The mixture of claim 1 wherein the concentration of said additive is present in a sufficient amount to produce a homeotropic boundary condition in said nematic liquid crystal when said mixture is placed between a pair of substantially parallel planar substrates spaced apart by approximately 5 to 150 microns.

4. A nematic liquid crystal mixture characterized by a homeotropic boundary condition when formed in a thin layer, said mixture comprising a nematic liquid crystal and an aliphatic mono-carboxylic acid monopolar additive having a minimum chain length of at least seven carbon atoms, said monopolar additive being characterized by a concentration of between approximately 0.5% and approximately 5% by weight thereof completely dissolving in the nematic liquid crystal.

5. A nematic liquid crystal mixture characterized by a homeotropic boundary condition when formed in a thin layer, said mixture comprising a nematic liquid crystal and an aliphatic nitrile monopolar additive, said monopolar additive characterized by a concentration of between approximately 0.5% and approximately 5% by weight thereof completely dissolving in the nematic liquid crystal.

6. A liquid crystal display device comprising: a sealed display cell having a pair of substantially parallel spaced substrates; a thin layer of a nematic liquid crystal mixture contained therebetween and in contact with an interior surface of each of said substrates; said mixture being characterized by a homeotropic boundary condition when formed in said thin layer and comprising a nematic liquid crystal and a monopolar additive selected from the group consisting of aliphatic mono-carboxylic acids and aliphatic nitriles, said additive being characterized by a concentration of between approximately 0.5% and approximately 5% by weight thereof completely dissolving in the nematic liquid crystal.

7. The liquid crystal display device of claim 6 wherein said nematic liquid crystal is characterized by a negative or a positive dielectric anisotropy.

8. A method of producing a homeotropic boundary condition in a nematic liquid crystal material, said method comprising the steps of: providing a quantity of the nematic liquid crystal material; selecting a soluble monopolar compound from the group consisting of aliphatic mono-carboxylic acids and aliphatic nitriles; and mixing said soluble monopolar compound into said nematic liquid crystal material in a concentration of between approximately 0.5% and approximately 5% by weight thereof completely dissolving in the nematic liquid crystal.

9. In combination with a display device includng a pair of closely spaced planar substrates with a nematic liquid crystal essentially completely sealed in and filling the space therebetween and means for applying an electric field to at least selected regions of said nematic liquid crystal, the improvement comprising a monopolar additive selected from the group of aliphatic mono-carboxylic acids and aliphatic nitriles, said monopolar additive completely dissolved in said nematic liquid crystal in a concentration of between approximately 0.5% and approximately 5% by weight to cause said nematic liquid crystal to assume a homeotropic boundary condition adjacent the facing interior surface of said substrates.

10. The combination of claim 9 wherein said aliphatic mono-carboxylic acids and said aliphatic nitriles have a chain length of at least seven carbon atoms.

* * * * *